(12) United States Patent
Bulea et al.

(10) Patent No.: US 8,456,443 B2
(45) Date of Patent: Jun. 4, 2013

(54) SINGLE-LAYER TOUCH SENSORS

(75) Inventors: Mihai M. Bulea, Santa Clara, CA (US); Patrick Worfolk, Cambell, CA (US)

(73) Assignee: Synaptics Incorporated, Santa Clara, CA (US)

( * ) Notice: Subject to any disclaimer, the term of this patent is extended or adjusted under 35 U.S.C. 154(b) by 795 days.

(21) Appl. No.: 12/508,920

(22) Filed: Jul. 24, 2009

(65) Prior Publication Data

US 2011/0017523 A1 Jan. 27, 2011

(51) Int. Cl.
*G09G 5/00* (2006.01)

(52) U.S. Cl.
USPC .......................... 345/174; 178/18.06; 463/37

(58) Field of Classification Search
USPC ..... 345/173, 174; 178/18.06, 19.03; 715/864; 463/37, 38
See application file for complete search history.

(56) References Cited

U.S. PATENT DOCUMENTS

| | | | |
|---|---|---|---|
| 4,087,625 A | 5/1978 | Dym et al. | |
| 4,264,903 A | 4/1981 | Bigelow et al. | |
| 5,374,787 A | 12/1994 | Miller et al. | |
| 5,495,077 A | 2/1996 | Miller et al. | |
| 5,543,590 A | 8/1996 | Gillespie et al. | |
| 5,543,591 A | 8/1996 | Gillespie et al. | |
| 5,648,642 A | 7/1997 | Miller et al. | |
| 5,650,597 A | 7/1997 | Redmayne | |
| 5,841,078 A | 11/1998 | Miller et al. | |
| 5,880,411 A | 3/1999 | Gillespie et al. | |
| 5,914,465 A | 6/1999 | Allen et al. | |
| 5,920,310 A | 7/1999 | Faggin et al. | |
| 6,028,271 A | 2/2000 | Gillespie et al. | |
| 6,188,391 B1 | 2/2001 | Seely et al. | |
| 6,239,389 B1 | 5/2001 | Allen et al. | |
| 6,288,707 B1 * | 9/2001 | Philipp | 345/168 |
| 6,297,811 B1 | 10/2001 | Kent et al. | |
| 6,380,931 B1 | 4/2002 | Gillespie et al. | |
| 6,414,671 B1 | 7/2002 | Gillespie et al. | |
| 6,489,899 B1 | 12/2002 | Ely et al. | |
| 6,610,936 B2 | 8/2003 | Gillespie et al. | |
| 6,667,740 B2 | 12/2003 | Ely | |
| 7,218,124 B1 * | 5/2007 | Mackey et al. | 324/660 |

(Continued)

FOREIGN PATENT DOCUMENTS

| | | |
|---|---|---|
| GB | 2439614 | 1/2008 |
| WO | WO-03/088176 | 10/2003 |

OTHER PUBLICATIONS

ISA/KR, International Search Report and Written Opinion for International Application No. PCT/US2009/053261, 11 pages, Aug. 13, 2010.

*Primary Examiner* — Tom Sheng

(57) ABSTRACT

A two-dimensional capacitive sensor device comprises first, second, and third sensor electrodes. The first sensor electrode has a varying width along a first direction, a maximum width at a first edge along the first direction, and a minimum width at a second edge along the first direction. The second sensor electrode has a varying width along the first direction and substantially identical widths at the first edge and second edge. The third sensor electrode has a varying width along the first direction, a minimum width at the first edge, and a maximum width at the second edge. The first, second, and third sensor electrodes have substantially equal surface area and are arranged in a first sensor cell with the second disposed between the first and third sensor electrodes. The two-dimensional capacitive sensor device comprises a plurality of sensor cells disposed in a repeated fashion in a single layer.

33 Claims, 12 Drawing Sheets

U.S. PATENT DOCUMENTS

| | | |
|---|---|---|
| 7,382,139 B2 * | 6/2008 | Mackey ........................ 324/660 |
| 7,688,080 B2 * | 3/2010 | Golovchenko et al. ....... 324/660 |
| 7,692,431 B2 * | 4/2010 | Mackey ........................ 324/660 |
| 7,821,502 B2 * | 10/2010 | Hristov ......................... 345/173 |
| 7,834,862 B2 * | 11/2010 | Liao et al. .................... 345/173 |
| 2003/0028346 A1 | 2/2003 | Sinclair |
| 2005/0270039 A1 * | 12/2005 | Mackey ........................ 324/660 |
| 2006/0097991 A1 | 5/2006 | Hotelling et al. |
| 2007/0008299 A1 | 1/2007 | Hristov |
| 2007/0247443 A1 | 10/2007 | Philipp |
| 2007/0257894 A1 | 11/2007 | Philipp |
| 2007/0279395 A1 * | 12/2007 | Philipp et al. ................. 345/173 |
| 2008/0007534 A1 | 1/2008 | Peng et al. |
| 2008/0024329 A1 | 1/2008 | Mackey et al. |
| 2008/0246496 A1 | 10/2008 | Hristov et al. |
| 2008/0278178 A1 | 11/2008 | Philipp |
| 2009/0194344 A1 * | 8/2009 | Harley et al. ............... 178/18.06 |
| 2009/0267916 A1 * | 10/2009 | Hotelling ...................... 345/174 |
| 2010/0295814 A1 * | 11/2010 | Kent et al. .................... 345/174 |

* cited by examiner

400

---

Forming On A Sensor Substrate A First Sensor Electrode Having A Varying Width Along A First Direction, A Maximum Width At A First Edge Along The First Direction, And A Minimum Width At A Second Edge Along The First Direction.
410

↓

Forming On The Sensor Substrate A Second Sensor Electrode Having A Varying Width Along The First Direction And Substantially Identical Widths At The First Edge And At The Second Edge.
420

↓

Forming On The Sensor Substrate A Third Sensor Electrode Having A Varying Width Along The First Direction, A Minimum Width At The First EDGE, And A Maximum Width At The Second Edge, Wherein The First Sensor Electrode, The Second Sensor Electrode, And The Third Sensor Electrode Are Arranged In A First Sensor Cell Of The Sensor Array.
430

↓

Forming On The Sensor Substrate A Fourth Sensor Electrode, The Fourth Sensor Electrode Having Substantially A Same Shape As The First Sensor Electrode.
440

↓

Forming On The Sensor Substrate A Fifth Sensor Electrode, The Fifth Sensor Electrode Having Substantially A Same Shape As The Second Sensor Electrode.
450

↓

Forming On The Sensor Substrate A Sixth Sensor Electrode, The Sixth Sensor Electrode Having Substantially A Same Shape As The Third Sensor Electrode, Wherein The Fourth Sensor Electrode, The Fifth Sensor Electrode, And The Sixth Sensor Electrode Are Arranged In A Second Sensor Cell Substantially Identical Or Substantially Symmetric With The First Sensor Cell.
460

FORMING ON A SENSOR SUBSTRATE A FIRST SENSOR ELECTRODE HAVING AT LEAST FOUR LINEAR SIDES AND A VARYING WIDTH ALONG A FIRST DIRECTION.
1210

FORMING ON THE SENSOR SUBSTRATE A SECOND SENSOR ELECTRODE HAVING AT LEAST FOUR LINEAR SIDES AND A VARYING WIDTH ALONG THE FIRST DIRECTION.
1220

FORMING ON THE SENSOR SUBSTRATE A THIRD SENSOR ELECTRODE HAVING AT LEAST FOUR LINEAR SIDES AND A VARYING WIDTH ALONG THE FIRST DIRECTION, WHEREIN THE FIRST SENSOR ELECTRODE, THE SECOND SENSOR ELECTRODE, AND THE THIRD SENSOR ELECTRODE ARE ARRANGED IN A FIRST SENSOR CELL OF THE SENSOR ARRAY.
1230

FORMING ON THE SENSOR SUBSTRATE A FOURTH SENSOR ELECTRODE, THE FOURTH SENSOR ELECTRODE HAVING SUBSTANTIALLY A SAME SHAPE AS THE FIRST SENSOR ELECTRODE.
1240

FORMING ON THE SENSOR SUBSTRATE A FIFTH SENSOR ELECTRODE, THE FIFTH SENSOR ELECTRODE HAVING SUBSTANTIALLY A SAME SHAPE AS THE SECOND SENSOR ELECTRODE.
1250

FORMING ON THE SENSOR SUBSTRATE A SIXTH SENSOR ELECTRODE, THE SIXTH SENSOR ELECTRODE HAVING SUBSTANTIALLY A SAME SHAPE AS THE THIRD SENSOR ELECTRODE, WHEREIN THE FOURTH SENSOR ELECTRODE, THE FIFTH SENSOR ELECTRODE, AND THE SIXTH SENSOR ELECTRODE ARE ARRANGED IN A SECOND SENSOR CELL SUBSTANTIALLY IDENTICAL OR SUBSTANTIALLY SYMMETRIC WITH THE FIRST SENSOR CELL.
1260

FIG. 12

SINGLE-LAYER TOUCH SENSORS

BACKGROUND

Capacitive sensor devices, otherwise known as touch sensor devices or proximity sensors are widely used in modern electronic devices. A capacitive sensor device is often used for touch based navigation, selection, or other input, in response to a finger, stylus, or other object being placed on or in proximity to a sensor of the capacitive sensor device. In such a capacity, capacitive sensor devices are often employed in computers (e.g. notebook/laptop computers), media players, multi-media devices, remote controls, personal digital assistants, smart devices, telephones, and the like.

Such capacitive sensor devices are often operated, at least in part, by a controller component such as an application specific integrated circuit (ASIC). The inputs and/or outputs of the controller component are typically used to drive the portions of the sensor devices and to measure capacitance(s) from the sensor devices. The measurements may include multiple inputs and/or outputs (e.g. receivers, transmitters and guards, etc.) and can include absolute and transcapacitive measurements.

Capacitive sensors types include single-layer sensors and multi-layer sensors.

BRIEF DESCRIPTION OF THE DRAWINGS

The accompanying drawings, which are incorporated in and form a part of the Description of Embodiments, illustrate various embodiments of the present invention and, together with the Description of Embodiments, serve to explain principles discussed below. The drawings referred to in this Brief Description of Drawings should not be understood as being drawn to scale unless specifically noted.

FIG. 4 is a flow diagram of an example method of creating a sensor array of a two-dimensional capacitive sensor device, according to an embodiment.

FIG. 12 is a flow diagram of an example method of creating a sensor array of a two-dimensional capacitive sensor device, according to an embodiment.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

As described above capacitive sensor types include single-layer and multi-layer capacitive sensors. Due to simplified construction, a single-layer capacitive sensor is relatively cheap when compared to any multi-layer capacitive sensor. However, common-mode noise and finger coupled noise are often problematic in single-layer capacitive sensing. For example, the presence of a liquid crystal display in close proximity to a single-layer capacitive sensor can provide noise which can interfere with the accuracy of sensing measurements made using the single-layer capacitive sensor.

In competitive environments, low cost of manufacture can be a competitive advantage. However, the accuracy of a single layer sensor is highly dependent on the sensor geometry and the noise in the measurements that are coupled into the sensor. Tri-electrode capacitive sensor cells are one type of sensor cell that can be used in a single layer capacitive sensor design, as they have high immunity to common mode noise and finger coupled noise. A method is described herein for determination of improved tri-electrode sensor cells that will be more accurate than conventional tri-electrode sensors due to very high noise immunity. Example implementations and creation of such single-layer capacitive sensor cells, determined according to this method, are described herein. It is appreciated that one or more of these sensor cells can be used in a capacitive sensor. One method described herein yields rectangular sensor cells that include electrodes with some curved borders. These curved borders may be difficult to manufacture in some implementations. As described herein, these curved borders can be piece-wise approximated with straight edges in the form of polygonal shaped electrodes that approximate the characteristics of the curved electrodes.

Along these lines, several examples of polygonal electrode embodiments are described herein.

Example Capacitive Sensor Apparatus

Figure 1:
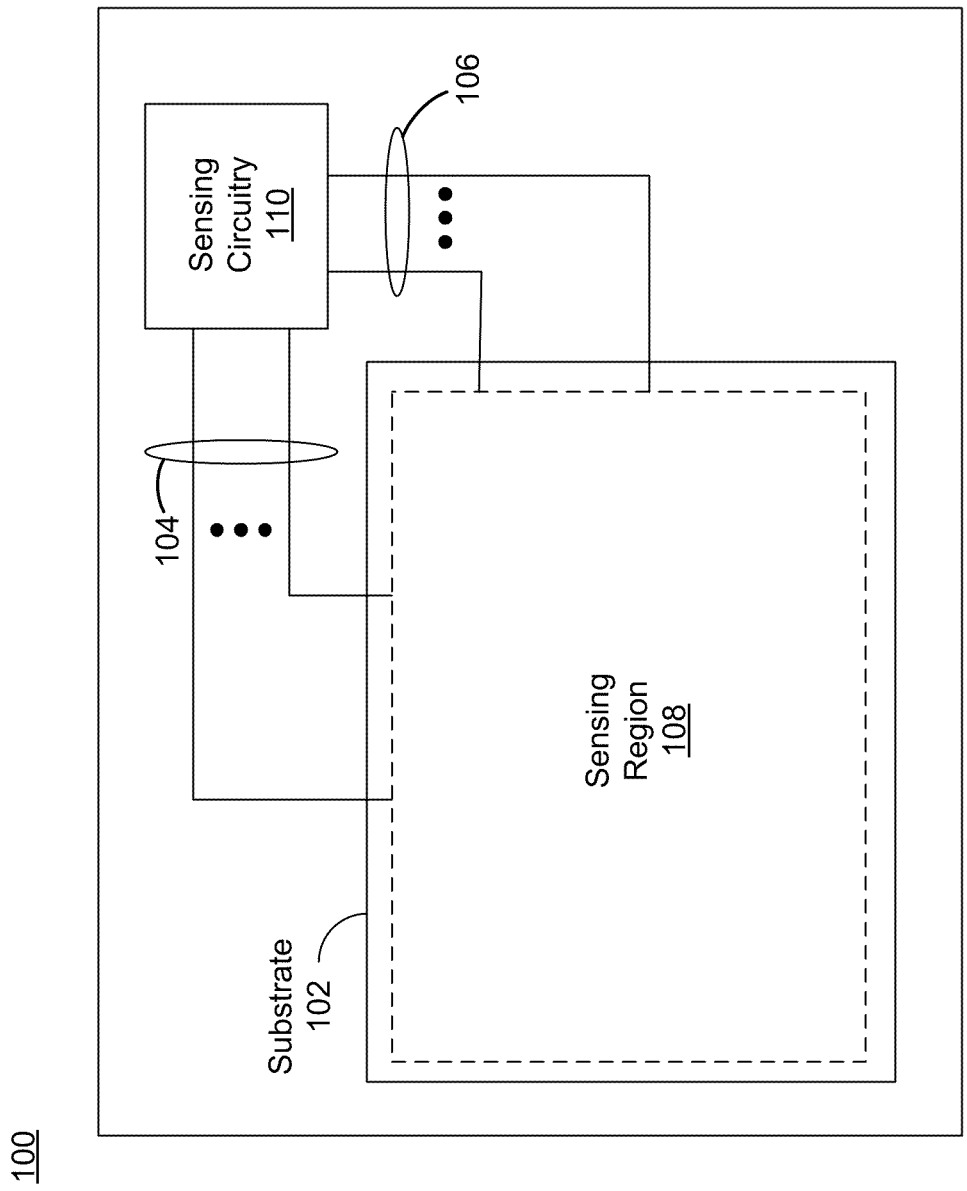
FIG. 1 is an example capacitive sensor apparatus that can be implemented to include one or more embodiments of the invention.

FIG. 1 is a plan view of an example two-dimensional capacitive sensor apparatus 100 that can be implemented to include one or more embodiments of the present invention. The capacitive sensor apparatus 100 can be utilized to communicate user input (e.g., using a user's finger or a probe) to a computing device or other electronic device. For example, capacitive sensor apparatus 100 can be implemented as a capacitive touch screen device that can be placed over an underlying image or an information display device (not shown). In this manner, a user would view the underlying image or information display by looking through the substantially transparent sensing region 108 of capacitive sensor apparatus 100 as shown. It is noted that one or more embodiments in accordance with the present invention can be incorporated with a capacitive touch screen device similar to capacitive sensor apparatus 100.

The capacitive sensor apparatus 100, when implemented as a touch screen, can include a substantially transparent substrate 102 having a first set of conductive coupling traces 104 and a second set of conductive coupling traces 106 patterned (or formed) thereon. Conductive coupling traces 104 and/or 106 can be utilized for coupling any sensor elements of sensor arrays (not shown) or conductive traces that would form a sensing region 108 with sensing circuitry 110 thereby enabling the operation of capacitive sensor apparatus 100. Conductive coupling traces 104 and 106 may each include one or more conductive coupling elements or traces. It is noted that embodiments of sensor electrode patterns (sensor arrays) in accordance with the invention are described herein which can be implemented to form sensing region 108.

Within FIG. 1, the capacitive sensor apparatus 100 can also be implemented as a capacitive touchpad device. For example, substrate 102 of capacitive sensor apparatus 100 can be implemented with, but is not limited to, one or more opaque materials that are utilized as a substrate for a capacitive touchpad device.

Example Single-Layer Tri-Electrode Capacitive Sensor Cells

Figure 2:
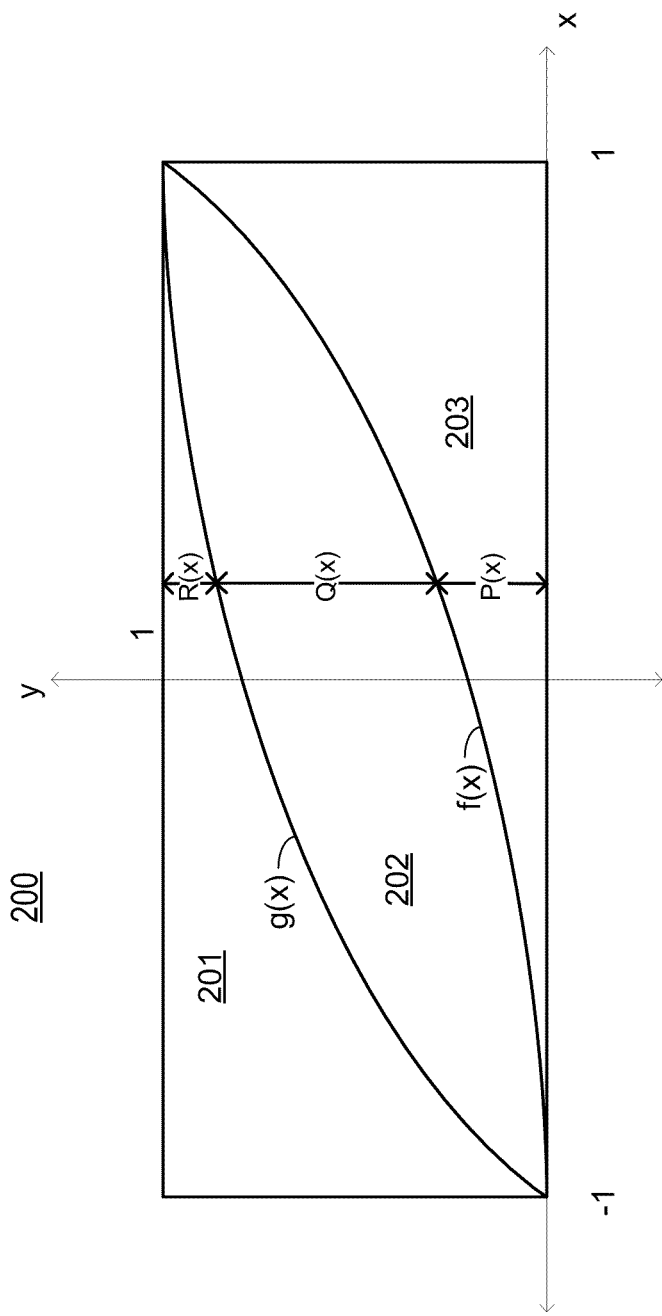
FIG. 2 shows a plan view of an example single-layer tri-electrode capacitive sensor cell, according to an embodiment.

FIG. 2 shows a plan view of an example single-layer tri-electrode capacitive sensor cell 200, according to an embodiment. Sensor cell 200 includes a first electrode 201, a second electrode 202, and a third electrode 203. FIG. 2 shows the coordinate system used to analyze an electrode pattern. Without loss of generality, it can be assumed that a single cell has coordinates $[-1,1] \times [0,1]$. It is appreciated that the same coordinate geometry is used with respect to FIG. 3.

With continued reference to FIG. 2, sensor cell 200 can be utilized in a single-layer sensor based on rectangular cells, where each cell contains three electrodes. Such a sensor can be implemented, in one embodiment, in sensing region 108 of FIG. 1. The use of three electrodes helps to minimize the impact of common mode noise and finger coupled noise, as will be demonstrated later on. Such a sensor can be used to determine the x and y positions of a contacting object such as a stylus or finger.

The y-position of a contact on a single-layer sensor, designed with a cell structure as in FIG. 2, is determined from considering the total measured capacitance of each cell. This is given by summing the measured capacitances of each electrode in a cell. Such a determination is well known in the art.

The x-position of the contacting object is determined by considering the relative capacitances of each electrode within sensor cell (e.g. sensor cell 200). It can be assumed that the measured capacitance on an electrode is proportional to the width, in the y direction, of the electrode at the point of contact. As such, the electrode shapes are designed with this in mind in order to minimize the x-position error.

In order to maximize performance, two rules are followed with regard to balance and span of the electrodes, in accordance with embodiments described herein. With respect to balance, the surface area of each sensor electrode in a sensor cell is designed to be substantially equal to facilitate noise immunity. With respect to span, a first sensor electrode (e.g., 201) starts from a width of zero or a minimum width for that sensor electrode and increases to its full width (which may be substantially the full width of the sensor cell) as it crosses the full span of the sensor cell, while a third sensor electrode (e.g., 203) starts at its full width (which may be substantially the full width of the sensor cell) and shrinks to zero width or a minimum width of that electrode as it crosses the full span of the sensor electrode. The second sensor electrode (e.g., 202) is defined by the surface area remaining between the first and third sensor electrodes, varies in width across the span of the sensor cell, and has a substantially equal width at each end of the span of the sensor cell.

With respect to sensor cell 200 of FIG. 2, according to one embodiment, the electrode shapes of electrodes 201, 202, and 203 are determined by the functions f(x) and g(x) on the interval $[-1,1]$, with the following constraints:

$$f(-1) = g(-1) = 0 \qquad \text{Equation 1}$$

$$f(1) = g(1) = 1 \qquad \text{Equation 2}$$

$$\int_{-1}^{1} f(x)\,dx = \frac{2}{3} \qquad \text{Equation 3}$$

$$\int_{-1}^{1} g(x)\,dx = \frac{4}{3} \qquad \text{Equation 4}$$

The integral constraints are the requirements that each sensor electrode be one third of the total surface area of the sensor cell.

According to one embodiment, the widths of the sensor electrodes are given by the following equations:

$$P(x) = f(x) \qquad \text{Equation 5}$$

$$Q(x) = g(x) - f(x) \qquad \text{Equation 6}$$

$$R(x) = 1 - g(x) \qquad \text{Equation 7}$$

The calculus of variations can be used, in one embodiment, to determine the functions f(x) and g(x) that minimize:

$$I = \frac{1}{2} \int_{-1}^{1} \|V(x)\|^2 \, dx \qquad \text{Equation 8}$$
$$= \frac{1}{2} \int_{-1}^{1} \left[ \left(\frac{dP}{dx}\right)^2 + \left(\frac{dQ}{dx}\right)^2 + \left(\frac{dR}{dx}\right)^2 \right] dx$$

The intuition behind this metric is that minimizing the functional "I" will give uniform performance across the width of the sensor cell. Consider, for example, a path in (P,Q,R) space parameterized by x. Then this metric is essentially the RMS (root mean square) of the "velocity" (dP/dx, dQ/dx, dR/dx). Minimizing "I" means that the sensor electrode widths should vary as smoothly as possible while satisfying the boundary and integral constraints. Substituting for P, Q, and R, as shown in Equation 9, defines the functional I(f',g') that is to be minimized $$I(f', g') = \int_{-1}^{1} [(f')^2 - f'g' + (g')^2] dx \qquad \text{Equation 9}$$

The minimization of Equation 9 is subject to the following constraints shown in Equations 10 and 11:

$$J_1(f) = \int_{-1}^{1} f\, dx = \frac{2}{3} \qquad \text{Equation 10}$$

$$J_2(g) = \int_{-1}^{1} g\, dx = \frac{4}{3} \qquad \text{Equation 11}$$

Using the technique of Lagrange multipliers, the minimization of Equation 9 subject to the constraints of Equation 10 and 11 is mapped to the minimization of:

$$I^*(f,g,f',g') = I(f',g') + \lambda_1 J_1(f) + \lambda_2 J_2(g) \qquad \text{Equation 12}$$

Omitting the calculations and skipping right to the end result, the calculation of variations method gives solutions for f and g that contain a total of six parameters. The parameters are determined from the two boundary conditions on each of f and g plus the two integral constraints. The result is shown in Equations 13 and 14 as:

$$f(x) = \frac{1}{4}(x+1)^2 \qquad \text{Equation 13}$$

$$g(x) = 1 - \frac{1}{4}(x-1)^2 \qquad \text{Equation 14}$$

Note that since all quadratics have three parameters, this solution is the unique quadratic that meets the boundary conditions and integral constraint. In other words, the unique quadratic solution is an extremal point of the functional I. Also note that the resulting cell electrode geometry is 180 degrees rotationally symmetric. The next step is to determine the x location from the measured capacitances (p, q, r). By assuming each measurement is linearly related to the width of the respective electrode at the x-location (assumed center of the contacting object position). The measurements are represented as Equations 15, 16, and 17:

$$p = \alpha P(x) + \beta \qquad \text{Equation 15}$$

$$q = \alpha Q(x) + \beta \qquad \text{Equation 16}$$

$$r = \alpha R(x) + \beta \qquad \text{Equation 17}$$

Here, alpha is the unknown linear scale and beta is the unknown common noise. Given three equations and three unknowns (alpha, beta, x), it is reasonable to expect to be able to solve for x. Substituting the formulas for p, q, and r into the above equations, and solving for x results in Equation 18:

$$x = \frac{(2q - p - r) - \sqrt{(2q - p - r)^2 + 3(r - p)^2}}{3(r - p)} \qquad \text{Equation 18}$$

By observation, it is easy to check that this solution is scale and common noise invariant. Let $s = (2q-p-r)/(3(r-p))$, then the solution is a function of s and the sign of (r-p), as is shown in Equation 19:

$$x = s - \text{sign}(r - p)\sqrt{s^2 + \frac{1}{3}} \qquad \text{Equation 19}$$

The above solution, in Equation 19 has one problem, namely it is singular when r=p, thus should only be applied when |r-p|>epsilon. When |r-p|<=epsilon, then x is small. Using first order approximations to p, q, and r, x can be solved for, as is shown in Equation 20:

$$x = \frac{p - r}{2(2q - p - r)} \qquad \text{Equation 20}$$

Note that for x small, it is expected that q≈2p≈2r so that 2q-p-r≈q will not be small. There are many ways to approximate the square root required in the inversion above and of deciding when to use the linear approximation. For example, by selecting the linear approximation whenever |r-p|<7|2q-p-r|, and approximating the square root using three iterations of the Babylonian method, starting with an initial estimate of 1, then the resulting value of x will have an absolute error of less than 0.1% of the span of the sensor cell. (The Babylonian method for computing y=sqrt(x) starts with an initial estimate y≈sqrt(x) and then proceeds by iteration y=(y+x/y)/2.

Aside from simplified manufacturing, there are a number of advantages to using electrodes that have piecewise linear boundaries. In particular, the formulas for x=x(P,Q,R) are typically simpler. Thus, one might approximate the function f(x) with a piecewise linear function to create polygonal shaped electrodes rather than curved electrodes (201, 202, and 203).

The two-piece linear function that best approximates f(x) (in the RMS sense) and meets the boundary conditions and integral constraints is the function that is linear on [-1,0] and [0,1]. This means that g(x) is also linear on the same regions, thus the sensor is split into two regions: the right half and the left half. This yields sensor electrodes where the right half and left half are rotationally symmetric.

In one embodiment, the sensor cell can also be spit into three regions: [-1,-alpha], [-alpha,alpha], [alpha,1], and a piecewise linear function linear in each region can be defined. There are three free parameters: alpha, f(-alpha), and f(alpha) and one integral constraint. This leaves two degrees of freedom that can be optimized over to give the best RMS fit to f(x). (In one embodiment, the sensor electrode can also be directly optimized for any metric of interest.)

In another variation, it may be desirable that no electrode width goes below some minimum value of epsilon. This requirement is achieved by adjusting the boundary conditions to those shown by Equations 21, 22, 23, and 24:

$$f(-1) = \epsilon \qquad \text{Equation 21}$$

$$f(1) = 1 - 2\epsilon \qquad \text{Equation 22}$$

$$g(-1) = 2\epsilon \qquad \text{Equation 23}$$

$$g(1) = 1 - \epsilon \qquad \text{Equation 24}$$

Figure 3:
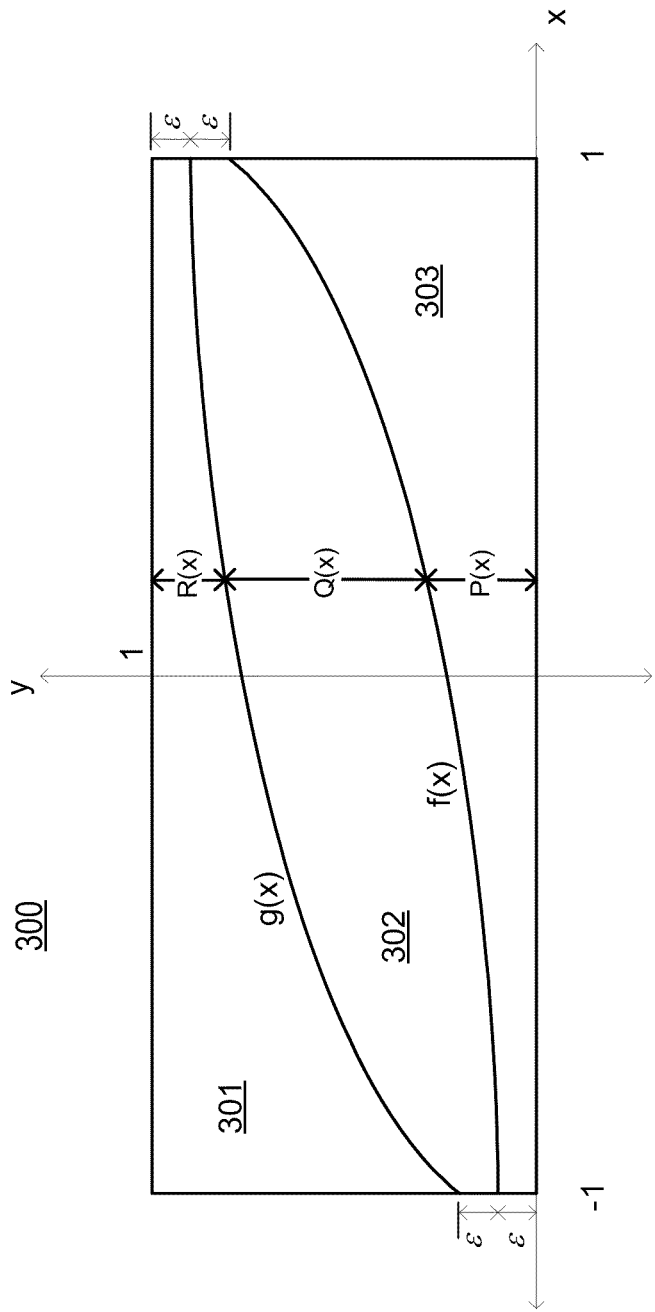
FIG. 3 shows a plan view of an example single-layer tri-electrode capacitive sensor cell in which the minimum widths of each electrode have been adjusted, according to one embodiment.

FIG. 3 shows a plan view of an example single-layer tri-electrode capacitive sensor cell 300 in which the minimum widths of each electrode have been adjusted, according to one embodiment. As can be seen the widths of sensor electrodes 301, 302, and 303 have each been adjusted by a width of ε, when compared to the widths of sensor electrodes 201, 202, and 203 as shown in FIG. 2. The resulting sensor electrode geometries of sensor cell 300 are defined by equations 25 and 26:

$$f(x) = \frac{1-3\varepsilon}{4}(x+1)^2 + \varepsilon \quad \text{Equation 25}$$

$$g(x) = 1 - \varepsilon - \frac{1-3\varepsilon}{4}(x-1)^2 \quad \text{Equation 26}$$

With reference to FIGS. 2 and 3, it can be seen that sensor electrodes 201, 202, and 203 of sensor cell 200 are located such that these sensor electrodes are not required to overlap each other to determine a first location along a first axis of a two-dimensional space and a second location along a second axis, where the second axis is substantially perpendicular or non-parallel to the first axis. It is also appreciated that a sum of the varying widths of sensor electrodes 201, 202, and 203 is substantially constant along a first direction running left to right (e.g., the x-axis) across the span of sensor cell 200. As can be seen, sensor electrodes 301, 302, and 303 of sensor cell 300 share these same properties.

Sensor electrodes 201, 202, and 203 of sensor cell 200 and the sensor electrodes 301, 302, and 303 of sensor cell 300 can be fabricated with any conductive material on any insulating substrate (e.g., substrate 102). For example, this may include conventional copper/fiberglass printed circuit construction, ITO (Indium Tin Oxide) patterned on glass, screen printed conductor patterned on plastic, and the like. It is noted that sensor cell 200 or sensor cell 300 may be used alone or in a larger pattern of sensor cells to detect objects on either side of the substrate onto which it is fabricated. To prevent detection of signals of noise from one side of the substrate, a ground plane or a driven shield conductor may be utilized to shield that side.

There are advantages associated with the single-layer construction of sensor cells 200 and 300. For example, since the manufacture of either sensor cell 200 or sensor cell 300 involves only one layer of conductive material, this reduces manufacturing costs relative to the two-layer X-Y grids often used in touchpads. Additionally, in the case of touch screens, doing all the fabrication using only one layer of conductive material eliminates low yield alignment steps. Furthermore, the optical properties of touch screens can also benefit from the use of only one layer of substantially transparent conductive material, such as ITO.

Within FIG. 2, it is understood that sensor electrodes 201, 202, and 203 of sensor cell 200 can individually be coupled with sensing circuitry 110 (FIG. 1) utilizing conductive coupling traces 104 and/or 106. The conductive traces can be dispose along a single side (e.g., the right or left edge of sensor cell 200). When coupled in this manner, sensor cell 200 can be utilized to form (or as a portion of) a sensor in sensing region 108. It is also understood that multiple copies (which may include reflected or rotated copies) of sensor cell 200 can be included in a sensor array, where the cells of the sensor array are coupled to conductive traces in the same fashion. It is appreciated that the coupling of conductive traces can be accomplished in a regular or decimated fashion (in a similar fashion to the examples shown in FIGS. 10A-11B).

Within FIG. 3, it is understood that sensor electrodes 301, 302, and 303 of sensor cell 300 can individually be coupled with sensing circuitry 110 (FIG. 1) utilizing conductive coupling traces 104 and/or 106. The conductive traces can be disposed along a single side (e.g., the right or left edge of sensor cell 300). When coupled in this manner, the sensor cell 300 can be utilized to form (or as pa portion of) a sensor in sensing region 108. It is also understood that multiple copies (which may include reflected or rotated copies) of sensor cell 300 can be included in a sensor array, where the cells of the sensor array are coupled to conductive traces in the same fashion. It is appreciated that the coupling of conductive traces can be accomplished in a regular or decimated fashion (in a similar fashion to the examples shown in FIGS. 10A-11B).

Example Method of Creating a Sensor Array of a Two-Dimensional Capacitive Sensor Device FIG. 4 is a flow diagram 400 of an example method of creating a sensor array of a two-dimensional capacitive sensor device, according to an embodiment. Elements of flow diagram 400 are described below, with reference to elements of FIG. 1-3. Consider an example where, in one embodiment, the method of flow diagram 400 is utilized to form a sensor cell and/or sensor array in sensing region 108 on substrate 102 of FIG. 1.

At 410 of flow diagram 400, in one embodiment, the method forms a first sensor electrode on a sensor substrate. The first sensor electrode has a varying width along a first direction, a maximum width at a first edge along the first direction, and a minimum width at a second edge along the first direction. In one embodiment, this comprises forming sensor electrode 201, or 301 on substrate 102. In one embodiment, the first direction comprises a left to right direction with respect to the x-axis shown in FIG. 2 or FIG. 3, and the first edge is the left edge of sensor cell 200 (or sensor sell 300) and the second edge is the right edge of sensor cell 200 (or sensor cell 300).

At 420 of flow diagram 400, in one embodiment, the method forms a second sensor electrode on the sensor substrate. The second sensor electrode has a varying width along the first direction and substantially identical widths at the first edge and at the second edge. In one embodiment, this comprises forming sensor electrode 202 on substrate 102 when the first sensor electrode was sensor electrode 201, or forming sensor electrode 302 on substrate 102 when the first sensor electrode was sensor electrode 301.

At 430 of flow diagram 400, in one embodiment, the method forms a third sensor electrode on the sensor substrate. The third sensor electrode has a varying width along the first direction, a minimum width at the first edge along the first direction, and a maximum width at the second edge along the first direction. In one embodiment, this comprises forming sensor electrode 203 on substrate 102 when the first sensor electrode was sensor electrode 201, or forming sensor electrode 303 on substrate 102 when the first sensor electrode was sensor electrode 301. In one embodiment, the first sensor electrode, the second sensor electrode, and the third sensor electrode are arranged in a first sensor cell of the sensor array. It is appreciated that this first sensor cell may be defined in a shape of a polygon, such as a rectangle. Sensor cells 200 and 300 are two examples of such rectangular shaped sensor cells.

At 440 of flow diagram 400, in one embodiment, the method further comprises forming a fourth sensor electrode on the sensor substrate, where the fourth sensor electrode has substantially a same shape as the first sensor electrode.

At 450 of flow diagram 400, in one embodiment, the method further comprises forming a fifth sensor electrode on the sensor substrate, where the fifth sensor electrode has substantially a same shape as the second sensor electrode.

At 460 of flow diagram 400, in one embodiment, the method further comprises forming a sixth sensor electrode on the sensor substrate, where the sixth sensor electrode has substantially a same shape as the third sensor electrode. The fourth, fifth, and sixth sensor electrodes are arranged in a second sensor cell substantially identical or substantially symmetric with the first sensor cell. For example, a second copy (or additionally copies) of sensor cell 200 or sensor cell 300 can be disposed on sensor substrate 102 via the procedures of 440, 450, and 460 of flow diagram 400.

Example Single-Layer Tri-Electrode Capacitive Sensor Cells with Polygonal Shaped Electrodes As previously described, there are some advantages to forming cells that include electrodes with polygonal edges or borders. All of the geometries described in FIGS. 4 through 11B have sensor cells with polygonal piecewise borders. This allows for easier fabrication and allows coordinate computations to be performed with very simple formulas (compared to the fabrication/computations used for the curved edge sensor electrodes of sensor cells 200 and 300). At the same time, these polygonal sensor electrode embodiments also share the same or similar high immunity to common mode and finger coupled noise as was described in accordance with sensor cells 200 and 300. In some embodiments (e.g., sensor cells 500, 600, and 800) the polygonal sensor electrodes are substantially piece-wise polygonal representations of the curved edge sensor electrodes in sensor cells 200 and/or 300. As with sensor cells 200 and 300, the sensor cells shown in FIGS. 5-11B are composed of electrodes placed in a single-layer, giving the same advantages described above.

Additionally, it is understood that sensor electrodes of the sensor cells in FIGS. 5-11B can individually be coupled with sensing circuitry (e.g., sensing circuitry 110 of FIG. 1) utilizing conductive coupling traces (e.g., coupling traces 104 and/or 106). The conductive traces can be along a single side (e.g., the right or left edge of sensor cell). Several examples of such single-sided coupling of conductive traces are shown in FIGS. 10A-11B. When conductively coupled in this manner, any of these sensor cells can be utilized to form, or as a portion of, a sensing region (e.g., sensing region 108 of FIG. 1).

With reference to FIGS. 5-11B, it can be seen that sensor electrodes in these Figures are located such that these sensor electrodes are not required to overlap each other to determine a first location along a first axis of a two-dimensional space and a second location along a second axis, where the second axis is substantially perpendicular or non-parallel to the first axis. It is also appreciated that a sum of the varying widths of sensor electrodes, for a respective sensor cell in these Figures, is substantially constant along a direction running left to right (e.g., the x-axis) across the span of the illustrated respective sensor cells.

The sensor electrodes of the sensor cells shown in FIGS. 5-11B can be fabricated with any conductive material on any insulating substrate (e.g., substrate 102). For example, this may include conventional copper/fiberglass printed circuit construction, Indium Tin Oxide (ITO) patterned on glass, screen printed conductor patterned on plastic, and the like. It is noted that the illustrated sensor cells in FIGS. 5-9 may be used alone or in a larger pattern (array) of sensor cells to detect objects on either side of the substrate onto which fabricated. To prevent detection of signals of noise from one side of the substrate, a ground plane or a driven shield conductor may be utilized to shield that side.

As previously described, there are advantages associated with the single-layer construction of sensor cells. For example, since their manufacture involves only one layer of conductive material, this reduces manufacturing costs relative to the two-layer X-Y grids often used in touchpads. Additionally, in the case of touch screens, doing all the fabrication using only one layer of conductive material eliminates low yield alignment steps. Furthermore, the optical properties of touch screens can also benefit from the use of only one layer of substantially transparent conductive material, such as ITO.

In FIGS. 5-9, for each described sensor cell geometry, the shape of the sensor electrodes inside a sensor cell is somewhat different than the shape of the sensor electrodes of the other respective sensor cells. However, the dimensions for each sensor electrode inside a cell follow a number of design rules. For example, the sensor electrodes inside a sensor cell are symmetrical relative to the center of the cell; the maximum width of the middle electrode inside a cell (FIGS. 5, 6, and 8), or the minimum width of the middle electrode (FIGS. 7 and 9) should be reached substantially in the middle of the sensor cell; and the surface areas of each sensor electrode in a respective sensor cell are substantially equal.

Figure 5:
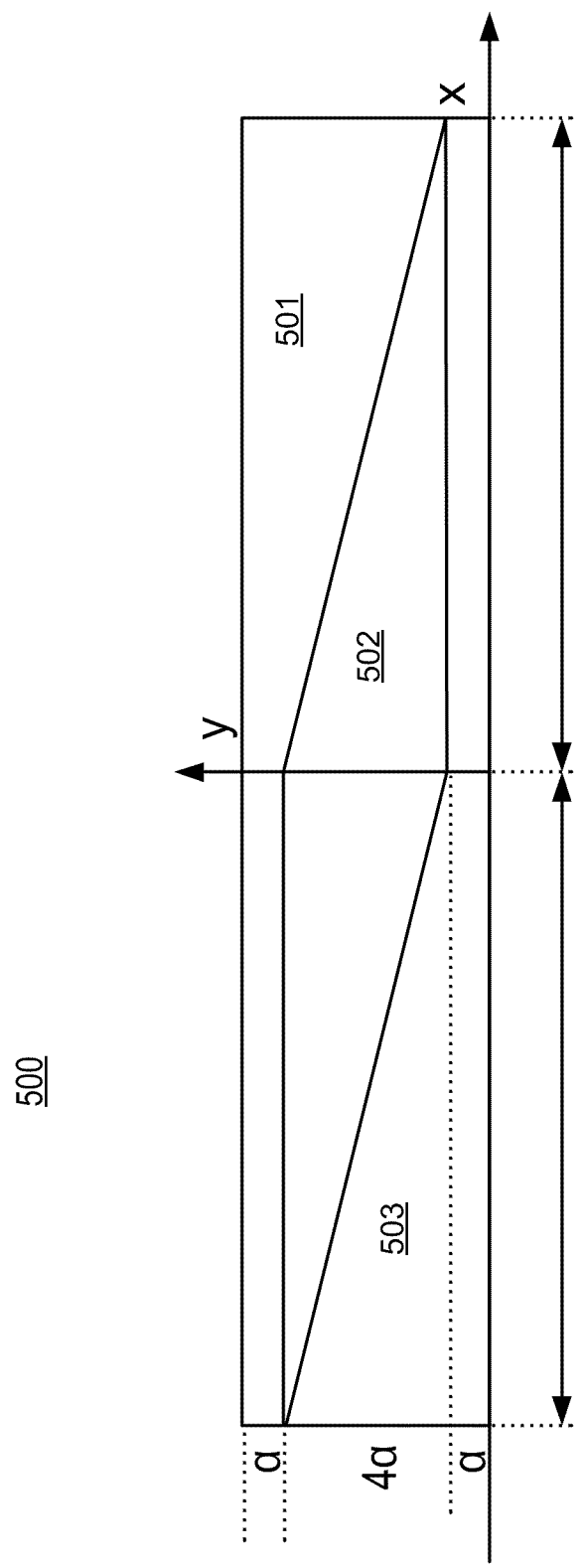
FIG. 5 shows a plan view of an example single-layer capacitive sensor cell with polygonal shaped electrodes, according to an embodiment.

FIG. 5 shows a plan view of an example single-layer capacitive sensor cell 500 with polygonal shaped electrodes, according to an embodiment. Sensor cell 500 comprises three sensor electrodes 501, 502, and 503 that are arranged to form a polygonal (rectangular) shaped sensor cell. Sensor cell 500 has two halves (left and right) that are defined in FIG. 5 by the y-axis. Each half is rotationally symmetric (180 degree) with the other half. As illustrated, sensor cell 500 has a width of 6α. In a left to right direction on the x-axis, sensor electrode 501 varies from its minimum width of α at the left edge of sensor cell 500 to its maximum width of 5α at the right edge of sensor cell 500. In this same left to right direction on the x-axis, sensor electrode 503 varies from its maximum width of 5α at the left edge of sensor cell 500 to its maximum width of α at the right edge of sensor cell 500. Sensor electrode 502, which is shaped like a parallelogram, is disposed between sensor electrodes 501 and 503 and in this same left to right direction varies from a minimum width of substantially zero to a maximum at substantially the midpoint of sensor cell 500 and back to a minimum width of substantially zero at a right edge of sensor cell 500. In one embodiment, where the minimum width of sensor electrodes 501 and 503 is α, the maximum width of sensor electrode 502 is substantially 4α.

While the Y coordinate computation (substantially perpendicular or non-parallel to sensor electrodes 501, 502, and 503) is a simple interpolation problem, the x-coordinate (along the x-axis of electrodes 501, 502, and 503) is computed from the relative widths of the electrodes in the touch area, using a simple formula that is shown in Equation 27 where the signals from the three adjacent electrodes are P from 501, Q from 502, and R from 503.

$$x = \frac{3}{4} \frac{P - R}{Q + |P - R| - \min(P, R)} \quad \text{Equation 27}$$

The geometry of sensor cell 500 achieves a high noise immunity (common-mode and finger-coupled noise). This comes from the fact that all electrodes (501, 502, 503) have substantially equal surface area. As such, in the presence of common-mode noise, each capacitance measurement signal from a sensor electrode (501, 502, 503) will be affected by the same quantity. That is, if the signals read from the three adjacent electrodes are P from 501, Q from 502, and R from 503, then in the presence of noise, the sensing circuitry will read a value shown by Equation 28, where ϵ represents noise:

$$P+\epsilon, Q+\epsilon, R+\epsilon \qquad \text{Equation 28}$$

By replacing the formula of Equation 28 in Equation 27 exactly the same formulas are achieved. This means that the x-coordinate is not affected by the common-mode noise.

The same behavior can be seen in the presence of finger-coupled noise, which can be modeled by considering that, in the presence of this type of noise, the sensing circuitry, instead of P, Q, R, will read a value as shown by Equation 29:

$$P+\epsilon P, Q+\epsilon Q, R+\epsilon R \qquad \text{Equation 29}$$

Again, by replacing the formula of Equation 29 in Equation 27 exactly the same formulas are achieved. This means that the x-coordinate is not affected by the finger-coupled noise.

Figure 6:
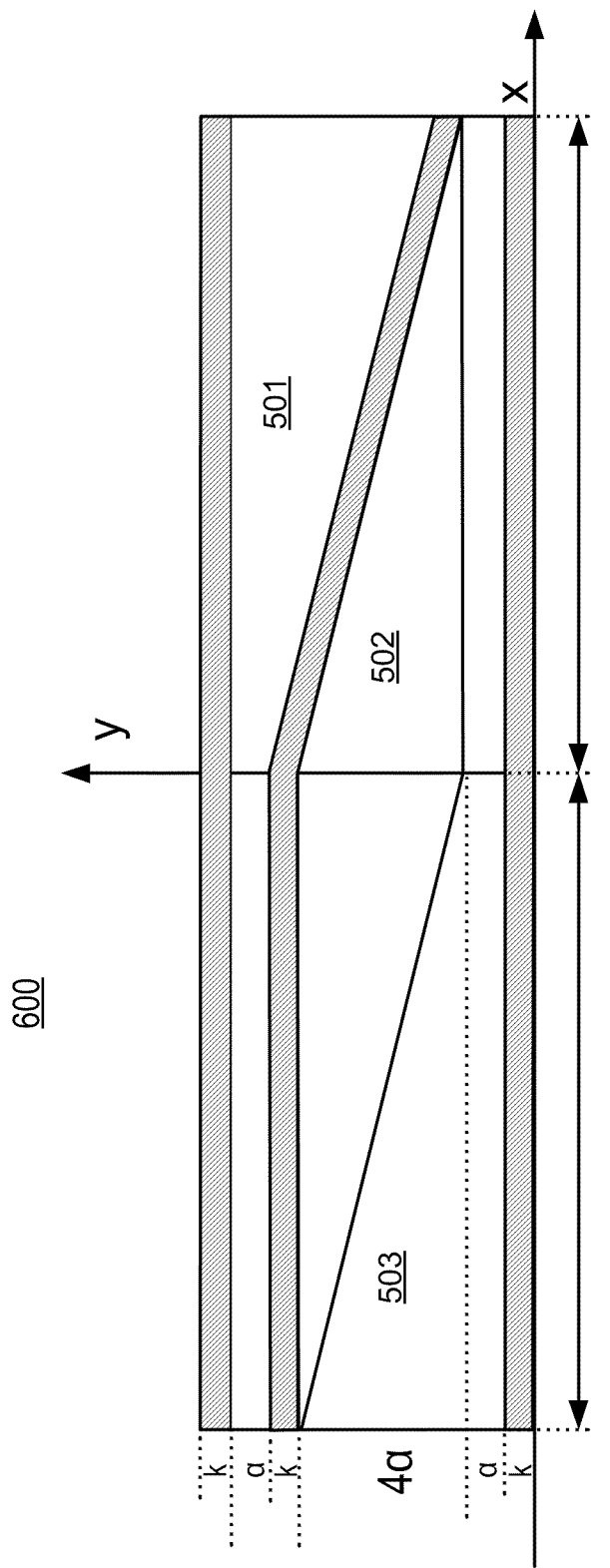
FIG. 6 shows a plan view of an example single-layer capacitive sensor cell with polygonal shaped electrodes with expanded minimum electrode width, according to an embodiment.

FIG. 6 shows a plan view of an example single-layer capacitive sensor cell 500 with polygonal shaped electrodes with expanded minimum electrode width, according to an embodiment. For the geometry presented in FIG. 5, it is appreciated that some electrodes become very narrow close to the left/right limits of sensor cell 500. The sensing circuitry measures the capacity between a finger and every electrode, and the readings will become very low and also highly non-linear with the surface area covered by the finger. As such, in some embodiments, the precision of the coordinate computation becomes low. Moreover, if the electrode material of sensor electrodes 501, 502, and 503 has high resistivity, more distortions are produced by the variations in the electrode resistance. A solution, in one embodiment, is to increase the width of each sensor with the same quantity, "k," as shown in sensor cell 600 of FIG. 6. It is appreciated that the geometries of the sensor cells shown in FIGS. 7-11B can be adjusted in a similar fashion. It is also appreciated that this is similar to the adjustment shown in FIG. 3.

Figure 7:
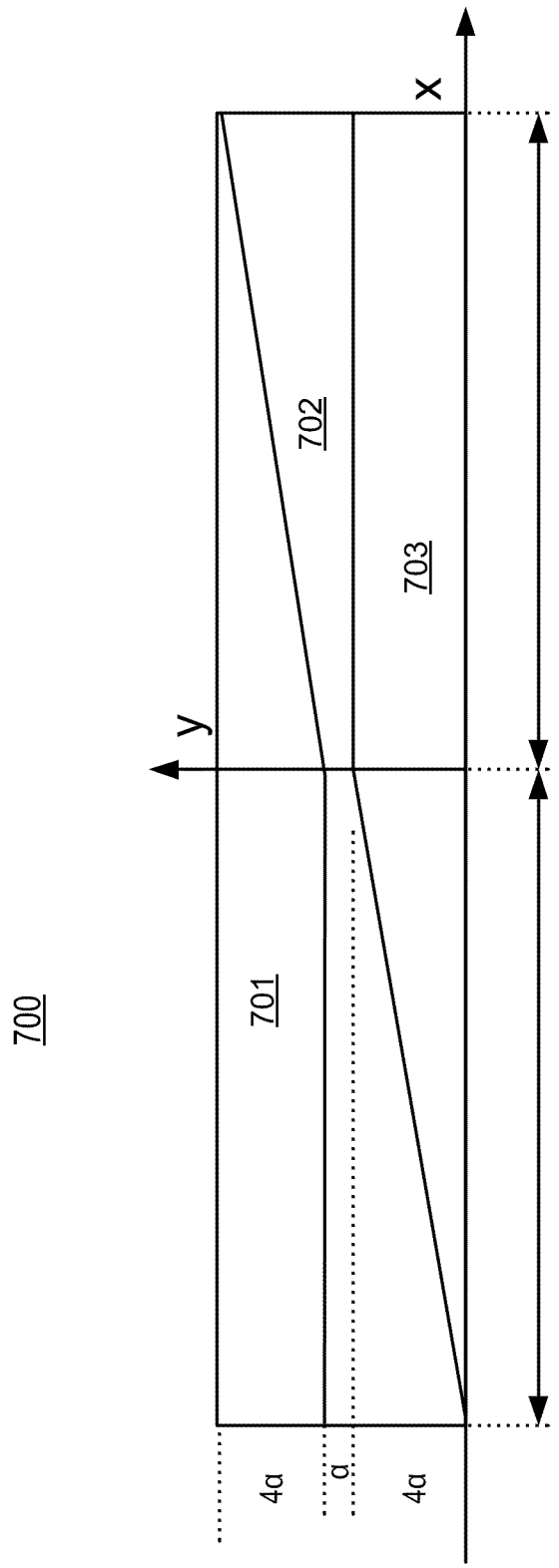
FIG. 7 shows a plan view of an example single-layer capacitive sensor cell with polygonal shaped electrodes, according to an embodiment.

FIG. 7 shows a plan view of an example single-layer capacitive sensor cell 700 with polygonal shaped electrodes, according to an embodiment. Sensor cell 700 comprises three sensor electrodes 701, 702, and 703 that are arranged to form a polygonal (rectangular) shaped sensor cell. Sensor cell 700 has two halves (left and right) that are defined in FIG. 7 by the y-axis. Each half is rotationally symmetric (180 degree) with the other half. As illustrated, sensor cell 700 has a width of 9α. In a left to right direction on the x-axis, sensor electrode 701 varies from its maximum width of 4α at the left edge of sensor cell 700 to its minimum width of substantially zero at the right edge of sensor cell 700. In this same left to right direction on the x-axis, sensor electrode 703 varies from its minimum width substantially zero at the left edge of sensor cell 700 to its maximum width of 4α at the right edge of sensor cell 700. Sensor electrode 702 is disposed between sensor electrodes 701 and 703 and in this same left to right direction varies from a maximum width of substantially 5α at the left edge to a minimum width of substantially α at substantially the midpoint of sensor cell 700 and back to a maximum width of 5α at a right edge of sensor cell 700. In one embodiment, where the maximum width of sensor electrodes 701 and 703 is 4α, the minimum width of sensor electrode 702 is substantially α.

While the Y coordinate computation (substantially perpendicular or non-parallel to sensor electrodes 701, 702, and 703) is a simple interpolation problem, the x-coordinate (along the x-axis of electrodes 701, 702, and 703) is computed from the relative widths of the electrodes in the touch area, using a simple formula that is shown in Equation 27, where the signals from the three adjacent electrodes are P from 701, Q from 702, and R from 703.

$$x = \frac{3}{4} \frac{P-R}{Q-2|P-R|-\min(P,R)} \qquad \text{Equation 30}$$

The geometry of sensor cell 700 achieves a high noise immunity (common-mode and finger-coupled noise). This comes from the fact that all electrodes (701, 702, 703) have substantially equal surface area. As such, in the presence of common-mode noise, each capacitance measurement signal from a sensor electrode (701, 702, 703) will be affected by the same quantity. That is, if the signals read from the three adjacent electrodes are P from 701, Q from 702, and R from 703, then in the presence of noise, the sensing circuitry will read a value shown by Equation 28, where ϵ represents noise.

By replacing the formula of Equation 28 in Equation 30 exactly the same formulas are achieved. This means that the x-coordinate is not affected by the common-mode noise.

The same behavior can be seen in the presence of finger-coupled noise, which can be modeled by considering that, in the presence of this type of noise, the sensing circuitry, instead of P, Q, R, will read a value as shown by Equation 29.

Again, by replacing the formula of Equation 29 in Equation 30 exactly the same formulas are achieved. This means that the x-coordinate is not affected by the finger-coupled noise.

Figure 8:
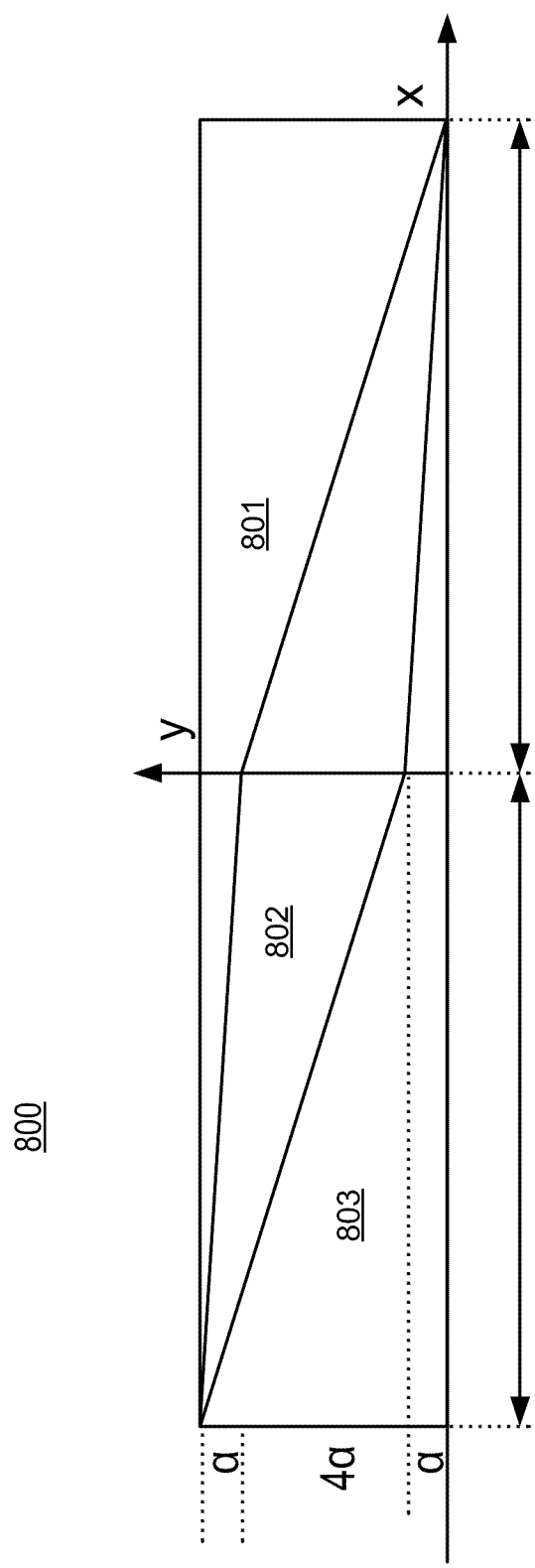
FIG. 8 shows a plan view of an example single-layer capacitive sensor cell with polygonal shaped electrodes, according to an embodiment.

FIG. 8 shows a plan view of an example single-layer capacitive sensor cell 800 with polygonal shaped electrodes, according to an embodiment. Sensor cell 800 comprises three sensor electrodes 801, 802, and 803 that are arranged to form a polygonal (rectangular) shaped sensor cell. Sensor cell 800 has two halves (left and right) that are defined in FIG. 8 by the y-axis. Each half is rotationally symmetric (180 degree) with the other half. As illustrated, sensor cell 800 has a width of 6α. In a left to right direction on the x-axis, sensor electrode 801 varies from its minimum width of substantially zero at the left edge of sensor cell 800 to its maximum width of substantially 6α at the right edge of sensor cell 800. In this same left to right direction on the x-axis, sensor electrode 803 varies from its maximum width of substantially 6α at the left edge of sensor cell 800 to its minimum width of substantially at the right edge of sensor cell 800. Sensor electrode 802, which is shaped like a parallelogram, is disposed between sensor electrodes 801 and 803 and in this same left to right direction varies from a minimum width of substantially zero at the left edge to a maximum width of substantially 4α at substantially the midpoint of sensor cell 800 and back to a minimum width of substantially zero at a right edge of sensor cell 800. In one embodiment, where the maximum width of sensor electrodes 801 and 803 is 4α, the maximum width of sensor electrode 802 is substantially 4α.

While the Y coordinate computation (substantially perpendicular or non-parallel to sensor electrodes 801, 802, and 803) is a simple interpolation problem, the x-coordinate (along the x-axis of electrodes 801, 802, and 803) is computed from the relative widths of the electrodes in the touch area, using a simple formula that is shown in Equation 31 where the signals from the three adjacent electrodes are P from 801, Q from 802, and R from 803.

$$x = \frac{P - R}{2Q + |P - R| - 2\min(P, R)} \qquad \text{Equation 31}$$

The geometry of sensor cell 800 achieves a high noise immunity (common-mode and finger-coupled noise). This comes from the fact that all electrodes (801, 802, 803) have substantially equal surface area. As such, in the presence of common-mode noise, each capacitance measurement signal from a sensor electrode (801, 802, 803) will be affected by the same quantity. That is, if the signals read from the three adjacent electrodes are P from 801, Q from 802, and R from 803, then in the presence of noise, the sensing circuitry will read a value shown by Equation 28, where $\epsilon$ represents noise.

By replacing the formula of Equation 28 in Equation 31 exactly the same formulas are achieved. This means that the x-coordinate is not affected by the common-mode noise.

The same behavior can be seen in the presence of finger-coupled noise, which can be modeled by considering that, in the presence of this type of noise, the sensing circuitry, instead of P, Q, R, will read a value as shown by Equation 29.

Again, by replacing the formula of Equation 29 in Equation 31 exactly the same formulas are achieved. This means that the x-coordinate is not affected by the finger-coupled noise.

Figure 9:
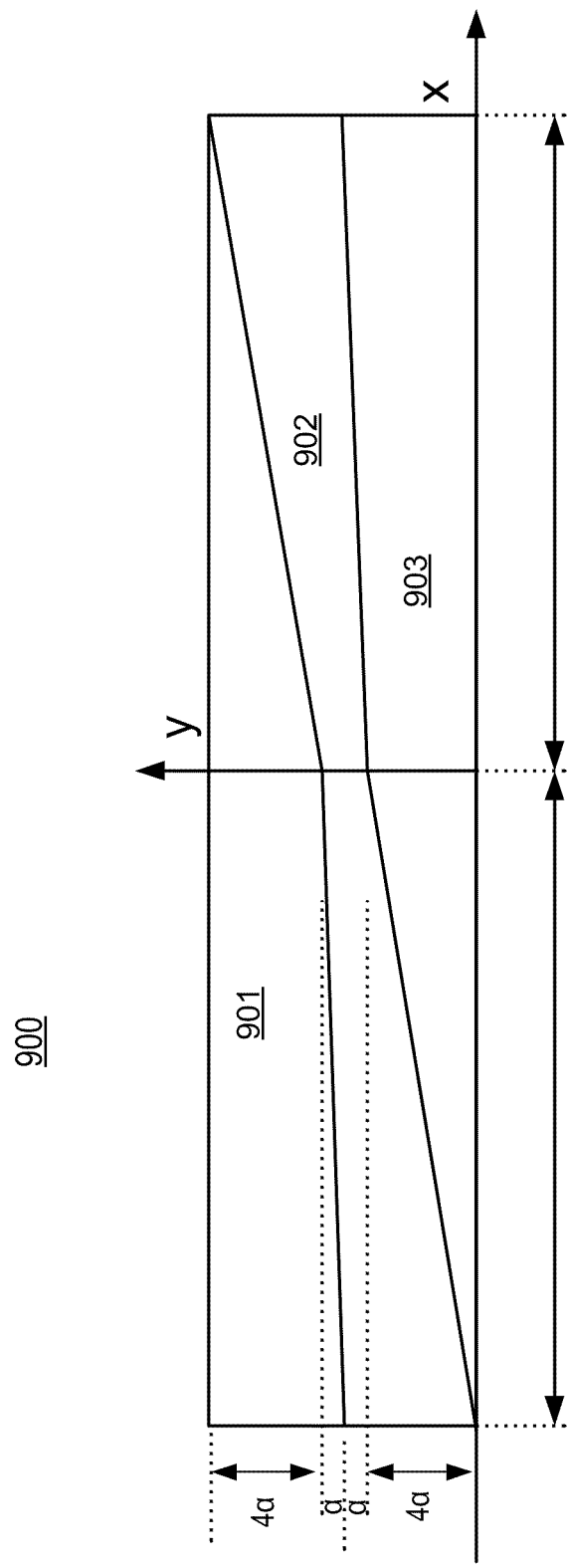
FIG. 9 shows a plan view of an example single-layer capacitive sensor cell with polygonal shaped electrodes, according to an embodiment.

FIG. 9 shows a plan view of an example single-layer capacitive sensor cell 900 with polygonal shaped electrodes, according to an embodiment. Sensor cell 900 comprises three sensor electrodes 901, 902, and 903 that are arranged to form a polygonal (rectangular) shaped sensor cell. Sensor cell 900 has two halves (left and right) that are defined in FIG. 9 by the y-axis. Each half is rotationally symmetric (180 degree) with the other half. As illustrated, sensor cell 900 has a width of 10α. In a left to right direction on the x-axis, sensor electrode 901 varies from its maximum width of 5α at the left edge of sensor cell 900 to its minimum width of substantially zero at the right edge of sensor cell 900. In this same left to right direction on the x-axis, sensor electrode 903 varies from its minimum width of substantially zero at the left edge of sensor cell 900 to its maximum width of substantially 5α at the right edge of sensor cell 900. Sensor electrode 902 is disposed between sensor electrodes 901 and 903 and in this same left to right direction varies from a maximum width of substantially 5α at the left edge to a minimum width of substantially α at substantially the midpoint of sensor cell 900 and back to a maximum width of substantially 5α at a right edge of sensor cell 900. In one embodiment, where the maximum width of sensor electrodes 901 and 903 is 5α, the maximum width of sensor electrode 902 is also substantially 5α.

While the Y coordinate computation (substantially perpendicular or non-parallel to sensor electrodes 901, 902, and 903) is a simple interpolation problem, the x-coordinate (along the x-axis of electrodes 901, 902, and 903) is computed from the relative widths of the electrodes in the touch area, using a simple formula that is shown in Equation 32, where the signals from the three adjacent electrodes are P from 901, Q from 902, and R from 903.

$$x = \frac{P - R}{2Q - 3|P - R| + 2\min(P, R)} \qquad \text{Equation 32}$$

The geometry of sensor cell 900 achieves a high noise immunity (common-mode and finger-coupled noise). This comes from the fact that all electrodes (901, 902, 903) have substantially equal surface area. As such, in the presence of common-mode noise, each capacitance measurement signal from a sensor electrode (901, 902, 903) will be affected by the same quantity. That is, if the signals read from the three adjacent electrodes are P from 901, Q from 902, and R from 903, then in the presence of noise, the sensing circuitry will read a value shown by Equation 28, where $\epsilon$ represents noise.

By replacing the formula of Equation 28 in Equation 32 exactly the same formulas are achieved. This means that the x-coordinate is not affected by the common-mode noise.

The same behavior can be seen in the presence of finger-coupled noise, which can be modeled by considering that, in the presence of this type of noise, the sensing circuitry, instead of P, Q, R, will read a value as shown by Equation 29.

Again, by replacing the formula of Equation 29 in Equation 32 exactly the same formulas are achieved. This means that the x-coordinate is not affected by the finger-coupled noise.

Figure 10A:
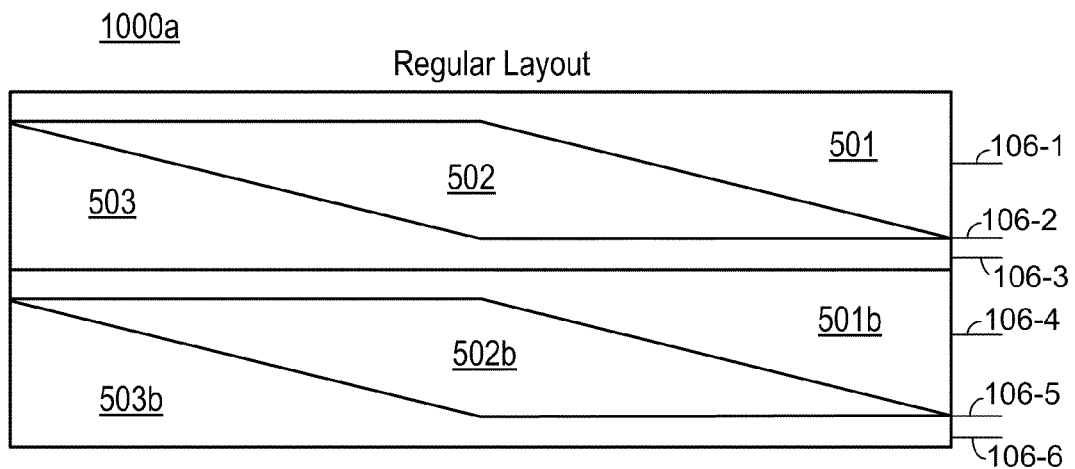
FIG. 10A shows a plan view of an example of a regular single-layer capacitive sensor array with polygonal shaped electrodes, according to an embodiment.

FIG. 10A shows a plan view of an example of a regular single-layer capacitive sensor array 1000A with polygonal shaped electrodes, according to an embodiment. Two copies of sensor cell 500 (FIG. 5) are used to form sensor array 1000A. It is appreciated that, in other embodiments, a greater plurality of these sensor cells can be arranged in this or other repeated fashion. All sensing electrodes 501, 502, 503, 501B, 502B, and 503B are coupled with sensing circuitry (e.g., sensing circuitry 110) via conductive traces (106-1, 106-2, 106-3, 106-4, 106-5, 106-6) that are disposed on a single edge of sensor array 1000A. Sensor array 1000A is regular in the sense that each sensor electrode is coupled to a separate conductive trace.

Figure 10B:
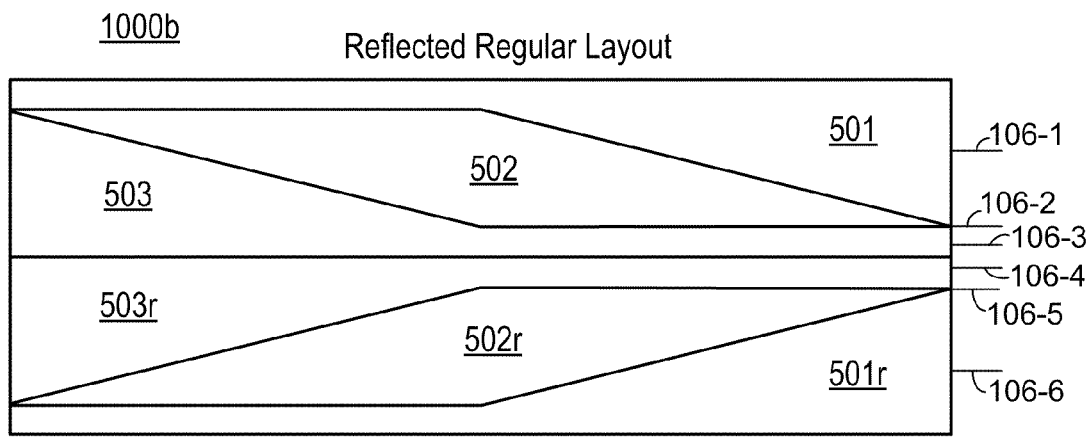
FIG. 10B shows a plan view of a second example of a regular layout of a single-layer capacitive sensor array with polygonal shaped electrodes, according to an embodiment.

FIG. 10B shows a plan view of a second regular layout of a single-layer capacitive sensor array 1000B with polygonal shaped electrodes, according to an embodiment. Two copies of sensor cell 500 (FIG. 5) are used to form sensor array 1000B; however the second copy is a reflection of the first copy. It is appreciated that, in other embodiments, a greater plurality of these sensor cells can be arranged in this or other repeated fashion. All sensing electrodes 501, 502, 503, 501r, 502r, and 503r are coupled with sensing circuitry (e.g., sensing circuitry 110) via conductive traces (106-1, 106-2, 106-3, 106-4, 106-5, 106-6) that are disposed on a single edge of sensor array 1000B. Sensor array 1000B is regular in the sense that each sensor electrode is coupled to a separate conductive trace.

Figure 11A:
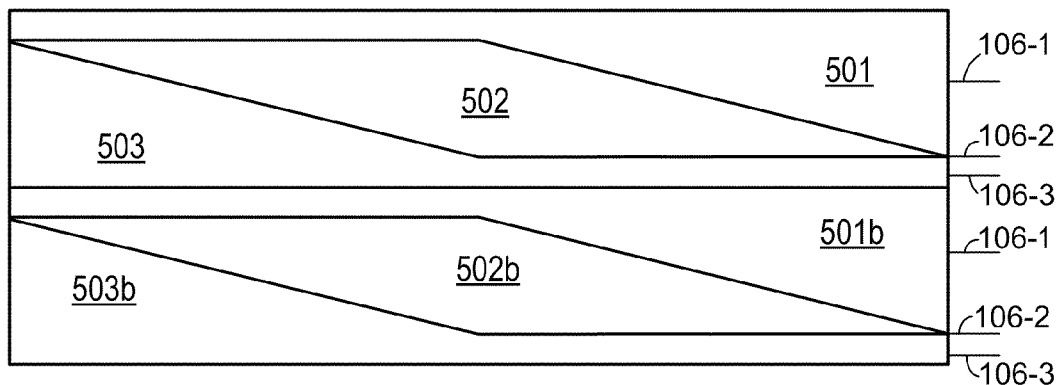
FIG. 11A shows a plan view of an example decimated single-layer capacitive sensor array with polygonal shaped electrodes, according to an embodiment.

FIG. 11A shows a plan view of an example of a decimated single-layer capacitive sensor array 1100A with polygonal shaped electrodes, according to an embodiment. Two copies of sensor cell 500 (FIG. 5) are used to form sensor array 1000A. It is appreciated that, in other embodiments, a greater plurality of these sensor cells can be arranged in this or other repeated fashion. All sensing electrodes 501, 502, 503, 501B, 502B, and 503B are coupled with sensing circuitry (e.g., sensing circuitry 110) via conductive traces (106-1, 106-2, 106-3) that are disposed on a single edge of sensor array 1000. Sensor array 1100A is decimated in the sense that pairs of like sensor electrodes (same shape) of the two sensor cells are coupled to the same conductive trace. This decimation can be carried out on a larger scale, with more sensor cells, in a similar manner. Decimation is used in some embodiments to improve the precision of the response of measurements obtained.

Figure 11B:
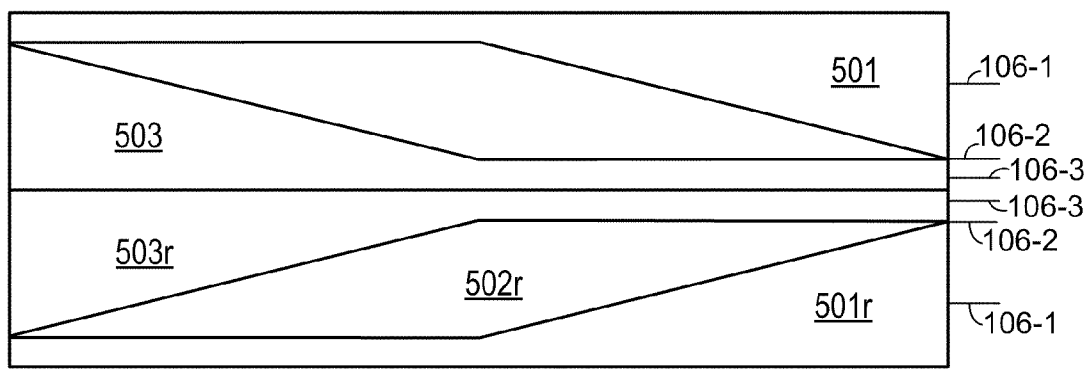
FIG. 11B shows a plan view of a second example decimated single-layer capacitive sensor array 1100B with polygonal shaped electrodes, according to an embodiment.

FIG. 11B shows a plan view of a second example of a decimated single-layer capacitive sensor array 1100B with polygonal shaped electrodes, according to an embodiment. Two copies of sensor cell 500 (FIG. 5) are used to form sensor array 1100B; however the second copy is a reflection of the first copy. It is appreciated that, in other embodiments, a greater plurality of these sensor cells can be arranged in this or other repeated fashion. All sensing electrodes 501, 502, 503, 501r, 502r, and 503r are coupled with sensing circuitry (e.g., sensing circuitry 110) via conductive traces (106-1, 106-2, 106-3) that are disposed on a single edge of sensor array 1100B. Sensor array 1100B is decimated in the sense that pairs of like sensor electrodes (same shape) of the two sensor cells are coupled to the same conductive trace. In some embodiments, pairs of sensor electrodes of different shapes from two or more sensor cells are coupled to the same conductive trace. This decimation can be carried out on a larger scale, with more sensor cells, in a similar manner. Decimation is used in some embodiments to improve the precision of the response of measurements obtained.

Although sensor cell 500 was used to illustrate the sensor arrays of FIGS. 10A-11B, it is appreciated that sensor cell 200, 300, 600, 700, 800, 900 or a like sensor cell can be implemented in an array in the same fashion.

Example Method of Creating a Sensor Array of a Two-Dimensional Capacitive Sensor Device FIG. 12 is a flow diagram 1200 of an example method of creating a sensor array of a two-dimensional capacitive sensor device, according to an embodiment. Elements of flow diagram 1200 are described below, with reference to elements of FIG. 5-11B. Consider an example where, in one embodiment, the method of flow diagram 1200 is utilized to form a sensor array in sensing region 108 on substrate 102 of FIG. 1.

At 1210 of flow diagram 1200, in one embodiment, the method forms a first sensor electrode on a substrate. The first sensor electrode has at least four linear sides and a varying width along a first direction. In one embodiment, this comprises forming sensor electrode 501, 701, 801, or 901 on substrate 102. In one embodiment, the first direction comprises a left to right direction along the x-axis (e.g., the x-axis as shown in FIGS. 5-11B).

At 1220 of flow diagram 1200, in one embodiment, the method forms a second sensor electrode on the substrate. The second sensor electrode has at least four linear sides and a varying width along the first direction. In one embodiment, this comprises forming sensor electrode 502 on substrate 102 when the first sensor electrode was sensor electrode 501, forming sensor electrode 702 on substrate 102 when the first sensor electrode was sensor electrode 701, forming sensor electrode 802 on substrate 102 when the first sensor electrode was sensor electrode 801, or forming sensor electrode 902 on substrate 102 when the first sensor electrode was sensor electrode 901.

At 1230 of flow diagram 1200, in one embodiment, the method forms a third sensor electrode on the sensor substrate. The third sensor electrode has at least four linear sides and a varying width along the first direction. The first sensor electrode, second sensor electrode, and third sensor electrode are arranged in a first sensor cell (500, 600, 700, 800, 900) of the sensor array (e.g., sensor array 1000A, 1000B, 1100A, 1100B or similar array). In one embodiment, this comprises forming sensor electrode 503 on substrate 102 when the first sensor electrode was sensor electrode 501, forming sensor electrode 703 on substrate 102 when the first sensor electrode was sensor electrode 701, forming sensor electrode 803 on substrate 102 when the first sensor electrode was sensor electrode 801, or forming sensor electrode 903 on substrate 102 when the first sensor electrode was sensor electrode 901. It is appreciated that this first sensor cell may be defined in the shape of a polygon, such as a rectangle. Sensor cells 500, 600, 700, 800, and 900 are several examples of such rectangular shaped sensor cells.

At 1240 of flow diagram 1200, in one embodiment, the method further comprises forming a fourth sensor electrode on the sensor substrate, where the fourth sensor electrode has substantially a same shape as the first sensor electrode. As shown by FIGS. 10A, 10B, 11A, and 11B, the fourth sensor electrode can be oriented in the same fashion as the first sensor electrode or can comprise a reflection of the first sensor electrode. It is appreciated that the fourth sensor electrode can also comprise a rotation (e.g., a 180 degree rotation) of the first sensor electrode.

At 1250 of flow diagram 1200, in one embodiment, the method further comprises forming a fifth sensor electrode on the sensor substrate, where the fifth sensor electrode has substantially a same shape as the second sensor electrode. As shown by FIGS. 10A, 10B, 11A, and 11B, the fifth sensor electrode can be oriented in the same fashion as the second sensor electrode or can comprise a reflection of the second sensor electrode. It is appreciated that the fifth sensor electrode can also comprise a rotation (e.g., a 180 degree rotation) of the second sensor electrode.

At 1260 of flow diagram 1200, in one embodiment, the method further comprises forming a sixth sensor electrode on the sensor substrate, where the sixth sensor electrode has substantially a same shape as the third sensor electrode. As shown by FIGS. 10A, 10B, 11A, and 11B, the sixth sensor electrode can be oriented in the same fashion as the third sensor electrode or can comprise a reflection of the third sensor electrode. It is appreciated that the sixth sensor electrode can also comprise a rotation (e.g., a 180 degree rotation) of the third sensor electrode.

The fourth, fifth, and sixth sensor electrodes are arranged in a second sensor cell substantially identical or substantially symmetric with the first sensor cell. FIGS. 10A, 10B, 11A, and 11B, two sensor cells in each displayed sensor array (1000A, 1000B, 1100A, 1100B). A third or additional copies of a sensor cell can be disposed on sensor substrate 102 via the procedures of 1240, 1250, and 1260 of flow diagram 1200.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated. It is intended that the scope of the present technology be defined by the claims appended hereto and their equivalents.

What is claimed is:

1. A two-dimensional capacitive sensor device comprising:
a first sensor electrode having a varying width along a first direction, a maximum width at a first edge along said first direction, and a minimum width at a second edge along said first direction;
a second sensor electrode having a varying width along said first direction and substantially identical widths at said first edge and at said second edge;
a third sensor electrode having a varying width along said first direction, a minimum width at said first edge, and a maximum width at said second edge;
wherein said first sensor electrode, said second sensor electrode, and said third sensor electrode are arranged in a first sensor cell;

wherein said second sensor electrode is disposed between said first sensor electrode and said third sensor electrode in the arrangement of said first sensor cell;

wherein said first sensor electrode, said second sensor electrode, and said third sensor electrode have substantially equal surface area; and wherein said two-dimensional capacitive sensor device comprises a plurality of sensor cells disposed in a repeated fashion in a single layer.

2. The two-dimensional capacitive sensor device of claim 1, wherein a boundary between said first sensor electrode and said second sensor electrode is substantially defined by the equation $$g(x) = 1 - \frac{1}{4}(x-1)^2$$

or wherein a boundary between said second sensor electrode and said third sensor electrode is substantially defined by the equation $$f(x) = \frac{1}{4}(x+1)^2.$$

3. The two-dimensional capacitive sensor device of claim 1, wherein a maximum or minimum width of a middle sensor electrode of said first sensor electrode, second sensor electrode, and third sensor electrode is located substantially halfway along said middle electrode, in said first direction.

4. A two-dimensional capacitive sensor device comprising:
a first sensor electrode having at least four linear sides and a varying width along a first direction;
a second sensor electrode having at least four linear sides and a varying width along said first direction; and
a third sensor electrode having at least four linear sides and a varying width along said first direction, wherein said first sensor electrode, said second sensor electrode, and said third sensor electrode are arranged in a first sensor cell;
wherein said two-dimensional capacitive sensor device comprises a plurality of sensor cells disposed in a repeated fashion in a single layer, wherein a middle sensor electrode of said first, second, and third sensor electrodes comprises a parallelogram shape, and wherein each of said first sensor electrode, second sensor electrode, and third sensor electrode are located such that said first sensor electrode, second sensor electrode, and third sensor electrode are not required to overlap each other to determine a first location along a first axis of a two-dimensional space and a second location along a second axis, wherein said second axis is substantially non-parallel to said first axis.

5. The two-dimensional capacitive sensor device of claim 4, wherein said plurality of sensor cells includes a second sensor cell comprising a reflected arrangement of said first sensor cell.

6. The two-dimensional capacitive sensor device of claim 4, wherein said first sensor cell comprises a polygonal shape.

7. The two-dimensional capacitive sensor device of claim 4, wherein each of said first sensor electrode, said second sensor electrode, and said third sensor electrode comprises a polygonal shape.

8. The two-dimensional capacitive sensor device of claim 4, wherein said first sensor electrode, said second sensor electrode, and said third sensor electrode have substantially equal surface area.

9. The two-dimensional capacitive sensor device of claim 4, wherein a maximum or minimum width of a middle sensor electrode of said first sensor electrode, second sensor electrode, and third sensor electrode is located substantially halfway along said middle electrode, in said first direction.

10. The two-dimensional capacitive sensor device of claim 4, wherein all connections between sensing circuitry and sensor electrodes of said plurality of said sensor cells are disposed on a single side of said two-dimensional capacitive sensor.

11. The two-dimensional capacitive sensor device of claim 4, wherein a sum of said varying widths of said first sensor electrode, said second sensor electrode, and said third sensor electrode is substantially constant along said first direction.

12. The two-dimensional capacitive sensor device of claim 4, wherein two identical sensor electrodes within separate sensor cells, of said plurality of sensor cells, are coupled with the same sensor conductor.

13. The two-dimensional capacitive sensor device of claim 4, wherein two identical sensor electrodes within separate sensor cells, of said plurality of sensor cells, are coupled with different sensor conductors.

14. A two-dimensional capacitive sensor device comprising:
a first sensor cell, said first sensor cell comprising:
a first sensor electrode having at least four linear sides;
a second sensor electrode having at least four linear sides; and
a third sensor electrode having at least four linear sides, wherein said first sensor electrode, said second sensor electrode, and said third sensor electrode are arranged in said first sensor cell such that said first sensor cell has 180 degree rotational symmetry about a midpoint of said first sensor cell, and wherein a middle sensor electrode of said first, second, and third sensor electrodes comprises a parallelogram shape.

15. The two-dimensional capacitive sensor device of claim 14, wherein said two-dimensional capacitive sensor device comprises a plurality of sensor cells disposed in a repeated fashion in a single layer.

16. The two-dimensional capacitive sensor device of claim 15, wherein said plurality of sensor cells includes a second sensor cell comprising a reflected arrangement of said first sensor cell.

17. The two-dimensional capacitive sensor device of claim 15, wherein all connections between sensing circuitry and sensor electrodes of said plurality of said sensor cells are disposed on a single side of said two-dimensional capacitive sensor device.

18. The two-dimensional capacitive sensor device of claim 14, wherein said first sensor electrode, said second sensor electrode, and said third sensor electrode have substantially equal surface area.

19. The two-dimensional capacitive sensor device of claim 14, wherein each of said first sensor electrode, second sensor electrode, and third sensor electrode are located such that said first sensor electrode, second sensor electrode, and third sensor electrode are not required to overlap each other to determine a first location along a first axis of a two-dimensional space and a second location along a second axis, wherein said second axis is substantially non-parallel to said first axis.

20. A method for creating a sensor array of a two-dimensional capacitive sensor device, said method comprising:

forming on a sensor substrate a first sensor electrode having at least four linear sides and a varying width along a first direction;

forming on said sensor substrate a second sensor electrode having at least four linear sides and a varying width along said first direction; and forming on said sensor substrate a third sensor electrode having at least four linear sides and a varying width along said first direction, wherein said first sensor electrode, said second sensor electrode, and said third sensor electrode are arranged in a first sensor cell of said sensor array, wherein a middle sensor electrode of said first, second, and third sensor electrodes comprises a parallelogram shape, and wherein each of said first sensor electrode, second sensor electrode, and third sensor electrode are located such that said first sensor electrode, second sensor electrode, and third sensor electrode are not required to overlap each other to determine a first location along a first axis of a two-dimensional space and a second location along a second axis, wherein said second axis is substantially non-parallel to said first axis.

21. The method as recited in claim 20, further comprising:

forming on said sensor substrate a fourth sensor electrode, said fourth sensor electrode having substantially a same shape as said first sensor electrode;

forming on said sensor substrate a fifth sensor electrode, said fifth sensor electrode having substantially a same shape as said second sensor electrode; and forming on said sensor substrate a sixth sensor electrode, said sixth sensor electrode having substantially a same shape as said third sensor electrode, wherein said fourth sensor electrode, said fifth sensor electrode, and said sixth sensor electrode are arranged in a second sensor cell substantially identical or substantially symmetric with said first sensor cell.

22. A two-dimensional capacitive sensor device comprising:

a first sensor electrode having at least four linear sides and a varying width along a first direction;

a second sensor electrode having at least four linear sides and a varying width along said first direction; and a third sensor electrode having at least four linear sides and a varying width along said first direction, wherein said first sensor electrode, said second sensor electrode, and said third sensor electrode are arranged in a first sensor cell;

wherein said two-dimensional capacitive sensor device comprises a plurality of sensor cells disposed in a repeated fashion in a single layer, wherein a middle sensor electrode of said first, second, and third sensor electrodes comprises a parallelogram shape.

23. The two-dimensional capacitive sensor device of claim 22, wherein said plurality of sensor cells includes a second sensor cell comprising a reflected arrangement of said first sensor cell.

24. The two-dimensional capacitive sensor device of claim 22, wherein said first sensor cell comprises a polygonal shape.

25. The two-dimensional capacitive sensor device of claim 22, wherein each of said first sensor electrode, said second sensor electrode, and said third sensor electrode comprises a polygonal shape.

26. The two-dimensional capacitive sensor device of claim 22, wherein said first sensor electrode, said second sensor electrode, and said third sensor electrode have substantially equal surface area.

27. The two-dimensional capacitive sensor device of claim 22, wherein a maximum or minimum width of a middle sensor electrode of said first sensor electrode, second sensor electrode, and third sensor electrode is located substantially halfway along said middle electrode, in said first direction.

28. The two-dimensional capacitive sensor device of claim 22, wherein all connections between sensing circuitry and sensor electrodes of said plurality of said sensor cells are disposed on a single side of said two-dimensional capacitive sensor.

29. The two-dimensional capacitive sensor device of claim 22, wherein a sum of said varying widths of said first sensor electrode, said second sensor electrode, and said third sensor electrode is substantially constant along said first direction.

30. The two-dimensional capacitive sensor device of claim 22, wherein two identical sensor electrodes within separate sensor cells, of said plurality of sensor cells, are coupled with the same sensor conductor.

31. The two-dimensional capacitive sensor device of claim 22, wherein two identical sensor electrodes within separate sensor cells, of said plurality of sensor cells, are coupled with different sensor conductors.

32. A method for creating a sensor array of a two-dimensional capacitive sensor device, said method comprising:

forming on a sensor substrate a first sensor electrode having at least four linear sides and a varying width along a first direction;

forming on said sensor substrate a second sensor electrode having at least four linear sides and a varying width along said first direction; and forming on said sensor substrate a third sensor electrode having at least four linear sides and a varying width along said first direction, wherein said first sensor electrode, said second sensor electrode, and said third sensor electrode are arranged in a first sensor cell of said sensor array, wherein a middle sensor electrode of said first, second, and third sensor electrodes comprises a parallelogram shape.

33. The method as recited in claim 32, further comprising:

forming on said sensor substrate a fourth sensor electrode, said fourth sensor electrode having substantially a same shape as said first sensor electrode;

forming on said sensor substrate a fifth sensor electrode, said fifth sensor electrode having substantially a same shape as said second sensor electrode; and forming on said sensor substrate a sixth sensor electrode, said sixth sensor electrode having substantially a same shape as said third sensor electrode, wherein said fourth sensor electrode, said fifth sensor electrode, and said sixth sensor electrode are arranged in a second sensor cell substantially identical or substantially symmetric with said first sensor cell.

* * * * *